(12) United States Patent
Willats et al.

(10) Patent No.: US 10,724,415 B1
(45) Date of Patent: Jul. 28, 2020

(54) EXHAUST AFTERTREATMENT COMPONENT WITH HEAT EXCHANGER

(71) Applicant: Faurecia Emissions Control Technologies, USA, LLC, Columbus, IN (US)

(72) Inventors: Robin Willats, Columbus, IN (US); Eric Nicole, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/390,163

(22) Filed: Apr. 22, 2019

(51) Int. Cl.
*F01N 3/28* (2006.01)
*F01N 3/20* (2006.01)

(52) U.S. Cl.
CPC ............ *F01N 3/2889* (2013.01); *F01N 3/206* (2013.01); *F01N 3/2066* (2013.01)

(58) Field of Classification Search
CPC ....... F01N 3/2889; F01N 3/206; F01N 3/2066
USPC .................................................. 422/168, 175
See application file for complete search history.

(56) References Cited

U.S. PATENT DOCUMENTS

| | | | |
|---|---|---|---|
| 4,426,844 A | 1/1984 | Nakano | |
| 4,875,436 A | 10/1989 | Smith et al. | |
| 5,474,751 A * | 12/1995 | Sigling | B01D 53/8625 422/177 |
| 5,983,628 A | 11/1999 | Borroni-Bird et al. | |
| 5,987,885 A | 11/1999 | Kizer et al. | |
| 7,077,776 B2 | 7/2006 | Sorab et al. | |
| 9,267,429 B2 | 2/2016 | Imran et al. | |
| 2006/0204417 A1* | 9/2006 | Rini | B01D 53/8625 423/210 |
| 2008/0260597 A1 | 10/2008 | Suzuki et al. | |
| 2012/0045378 A1* | 2/2012 | Soukhojak | F01N 3/2066 423/212 |
| 2015/0113964 A1* | 4/2015 | Henry | B01D 53/9495 60/287 |

FOREIGN PATENT DOCUMENTS

| | | |
|---|---|---|
| EP | 2789818 A1 | 10/2014 |
| JP | 2011032931 A | 2/2011 |
| WO | 2017136735 A1 | 8/2017 |

* cited by examiner

*Primary Examiner* — Tom P Duong
(74) *Attorney, Agent, or Firm* — Carlson, Gaskey & Olds, P.C.

(57) ABSTRACT

An exhaust component includes a housing defining an internal cavity, at least one exhaust aftertreatment component positioned within the internal cavity, and a heat exchanger. The housing has an inlet configured to receive engine exhaust gases and an outlet configured to direct the engine exhaust gasses into a tailpipe. A reductant source is associated with the housing and produces ammonia to mix with engine exhaust gases entering the exhaust aftertreatment component. The heat exchanger is positioned within the internal cavity to reduce a temperature of the engine exhaust gases exiting the outlet.

25 Claims, 2 Drawing Sheets

EXHAUST AFTERTREATMENT COMPONENT WITH HEAT EXCHANGER

BACKGROUND OF THE INVENTION

A thermal system is used to elevate the temperature of exhaust gas to activate a selective catalytic reduction (SCR) catalyst in a vehicle exhaust system. The SCR catalyst reduces levels of NOx using ammonia as a reductant. The reducing agent, such as diesel exhaust fluid (DEF) for example, reacts with NOx to convert pollutants into nitrogen and water. The catalyst is arranged in a housing having an outlet to a tailpipe. The tailpipe is subject to a temperature limit to avoid overheating the ground/road. When there are tight packaging constraints it is challenging to effectively control a tailpipe outlet temperature from the housing. It is therefore desirable to provide a thermal management system that can control outlet temperatures.

SUMMARY OF THE INVENTION

In one exemplary embodiment, an exhaust component includes a housing defining an internal cavity, at least one exhaust aftertreatment component positioned within the internal cavity, and a heat exchanger. The housing has an inlet configured to receive engine exhaust gases and an outlet configured to direct the engine exhaust gasses into a tailpipe. A reductant source is associated with the housing and produces ammonia to mix with engine exhaust gases entering the exhaust aftertreatment component. The heat exchanger is positioned within the internal cavity to reduce a temperature of the engine exhaust gases exiting the outlet.

In a further embodiment of the above, the heat exchanger is positioned within an outlet duct that is configured to direct the engine exhaust gases into the tailpipe.

In a further embodiment of any of the above, the housing has a box shape with an outlet duct integrated into an end wall of a stamping of the housing, and wherein the heat exchanger is associated with the outlet duct.

In another exemplary embodiment, an exhaust component includes a housing defining an internal cavity and having an inlet configured to receive engine exhaust gases and an outlet. At least one exhaust aftertreatment component is positioned within the internal cavity. A reductant source is associated with the housing and produces ammonia to mix with engine exhaust gases entering the exhaust aftertreatment component. A tailpipe is coupled to the outlet and a heat exchanger is positioned within the internal cavity to reduce a temperature of the engine exhaust gases prior to exiting the outlet and entering the tailpipe.

In a further embodiment of any of the above, a control system controls the heat exchanger to provide a predetermined tailpipe temperature.

These and other features of this application will be best understood from the following specification and drawings, the following of which is a brief description.

DETAILED DESCRIPTION

Figure 1:
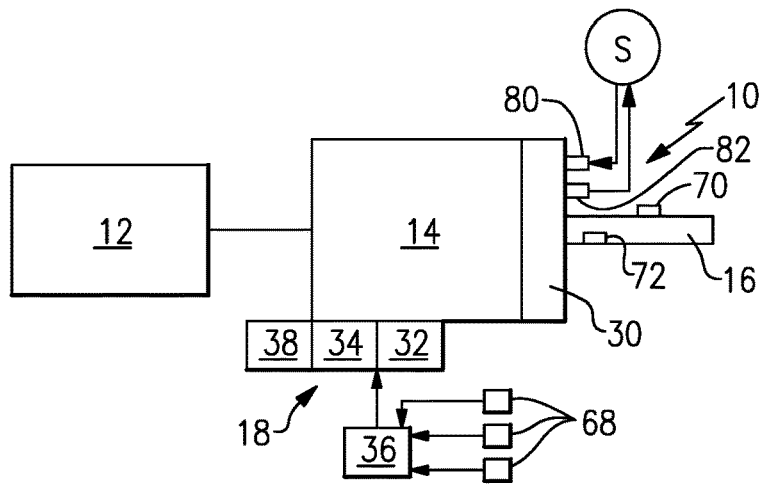
FIG. 1 is a schematic diagram of a vehicle exhaust system incorporating a box-type configuration for an exhaust aftertreatment component.

FIG. 1 shows a schematic representation of a vehicle exhaust system 10 that conducts hot engine exhaust gases generated by an engine 12 through various exhaust components to reduce emissions and control noise as known. In one example configuration, the exhaust system 10 includes at least one exhaust component 14 that is used to reduce levels of NOx before the exhaust gas exits the system via a tailpipe 16. In one example, a reducing agent from a reductant system 18 reacts with NOx to convert pollutants into nitrogen and water.

The exhaust system 10 can optionally include one or more additional exhaust components that are positioned downstream of the engine 12 and upstream from the exhaust component 14. The exhaust system 10 may also include additional components that are positioned downstream from the exhaust component 14. In one example, the upstream exhaust components can include an exhaust manifold, turbocharger, a catalyst, exhaust pipes, etc. In one example, the downstream exhaust components can include a muffler, resonator, additional catalyst, exhaust pipes, etc.

Figure 2:
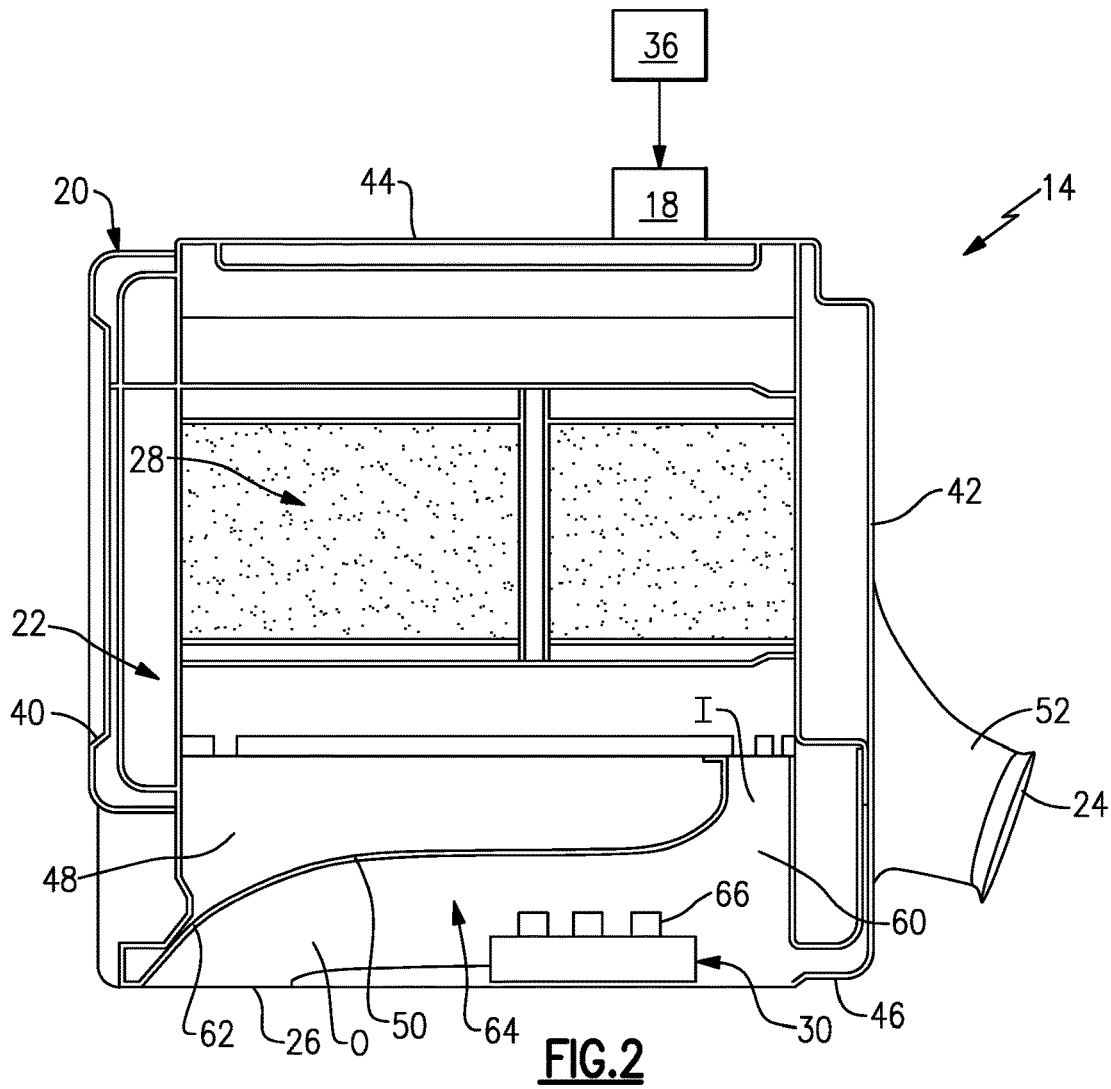
FIG. 2 is a schematic representation of one example of the box-type configuration from the system of FIG. 1 that incorporates the subject invention.

In one example shown in FIG. 2, the exhaust component 14 includes a housing 20 defining an internal cavity 22. The housing 20 has an inlet 24 configured to receive the engine exhaust gases and an outlet 26 that directs the exhaust gases to the tailpipe 16. At least one exhaust aftertreatment component 28 is positioned within the internal cavity 22. A reductant source from the reductant system 18 is associated with the housing 20. The reductant source produces ammonia to mix with engine exhaust gases entering the exhaust aftertreatment component 28. At least one heat exchanger 30 is positioned within the internal cavity 22 to reduce exhaust gas temperature of the engine exhaust gases exiting the outlet 26. This prevents overheating of the tailpipe 16.

In one example, the at least one exhaust aftertreatment component 28 comprises a selective catalytic reduction (SCR) catalyst or a SCR with a filter (SCRF). One or more additional exhaust aftertreatment components, such as a diesel oxidation catalyst (DOC) or a combination of a DOC and a diesel particulate filter (DPF) for example, can also be included in the system 10 upstream from the SCR catalyst. Additionally, a mixer component may be incorporated into the system between the SCR and the reductant system 18.

As discussed above, the reductant system 18 provides a reducing agent from a reductant supply or reductant source 32 that reacts with NOx to convert pollutants into nitrogen and water. In one example, the reductant system 18 injects fluid, for example ammonia, a diesel exhaust fluid (DEF), e.g, AdBlue, or a reducing agent such as a solution of urea and water, upstream of the exhaust aftertreatment component 14, e.g. the selective catalytic reduction (SCR) catalyst, to mix with an exhaust gas stream entering the housing 20 via the inlet 24. In one example, the reductant system 18 includes a doser or injector 34 (FIG. 1) that receives fluid from the reductant source 32 and a control system 36 with an electronic control unit that controls injection of the fluid. In another example, the reductant source 32 comprises a solid reductant in a cartridge that is configured to produce gaseous ammonia when the reductant is heated. Any type of reductant source 32 can be used with the system. In configurations that use an injector/doser 34, it should be understood that the structure and operation of the injector/doser 34 is well known and will not be discussed in further detail. The control system 36 is configured to control the supply of reductant to the internal cavity 22 upstream of the exhaust aftertreatment component 28.

FIG. 2 is a schematic representation of one example of the exhaust component 14 from the system 10 of FIG. 1. In this example, the housing 20 comprises a box-shaped configuration having opposing first 40 and second 42 sidewalls connecting opposing third 44 and fourth 46 sidewalls. A pair of end walls 48 are connected to opposing edges of the sidewalls 40, 42, 44, 46 to enclose the internal cavity 22. Only one end wall 48, e.g. the back end wall, is shown in FIG. 2 with the understanding that the front end wall would be placed over the components located in the cavity 22. In one example configuration, the box-shape comprises a square shape that is utilized when there are tight packaging constraints.

In the example of FIG. 2, the aftertreatment component 28 is positioned within the housing 20 adjacent to an outlet duct 50. An inlet tube 52 is coupled to the housing inlet 24 to receive engine exhaust gas from the engine 12. The reductant system 18 is also associated with the housing 20 and includes an injector or dosing member 34 that receives fluid from the reductant source 32 and injects the reductant into an open area within the cavity 22 that is upstream from the aftertreatment component 28. The control system 36 can be programmed to control injection of the reductant in a known manner The aftertreatment component 28 has an inlet end and an outlet end. The inlet tube 52 directs exhaust gases into the open area upstream of the inlet end. The reducing agent is supplied to mix with the exhaust gases prior to entering the inlet end of the aftertreatment component 28. Exhaust gases exiting the outlet end of the aftertreatment component 28 are directed into the outlet duct 50.

The outlet duct 50 has an upstream end 60 that receives exhaust gases exiting the aftertreatment component 28 and a downstream end 62 that is associated with the outlet 26 from the housing 20. The outlet duct 50 defines an engine exhaust gas flowpath 64 that has a variable cross-section from the upstream end 60 to the downstream end 62. In one example, the engine exhaust gas flowpath has a first cross-section at an upstream location near an inlet I to the outlet duct 50 and a second cross-section at a downstream location near an outlet O from the outlet duct 50, wherein the second cross-section is greater than the first cross-section. This provides a diffusing shape that facilitates temperature reduction at the outlet 26.

Figure 3:
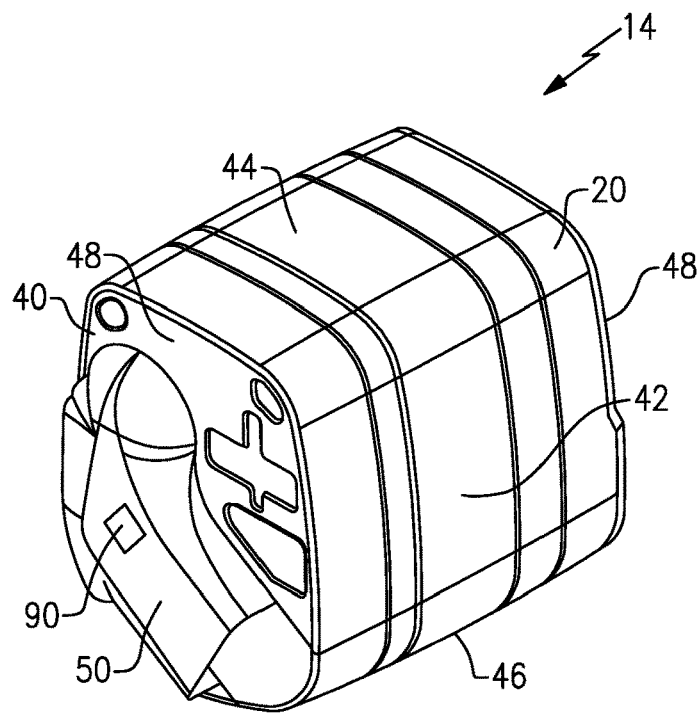
FIG. 3 shows a perspective view of the box-type configuration of FIG. 1.

FIGS. 2 and 3 show an example where the heat exchanger 30 is comprises a housing or structure that is positioned within the outlet duct 50 to reduce exhaust gas temperature before the exhaust gases exit the housing 20 and enter the tailpipe 16. The heat exchanger 30 includes at least one inlet 80 and at least one outlet 82 port (FIG. 1) to circulate cooling fluid from a fluid supply S through the heat exchanger 30 in a known manner. The heat exchanger 30 can be formed from a ceramic material, for example; however, other materials could also be used. The heat exchanger 30 can include heat exchange surfaces 66 that are modified to include fins, protrusions, etc. and/or the heat exchanger 30 could use coiled tubes to enhance temperature reduction. The heat exchanger 30 can be used for energy recovery or chemical conversion of urea water solution to a low temperature reductant, such as ammonium carbamate for example. Recovered energy could also be used to heat a reductant supply cartridge if needed.

Figure 4:
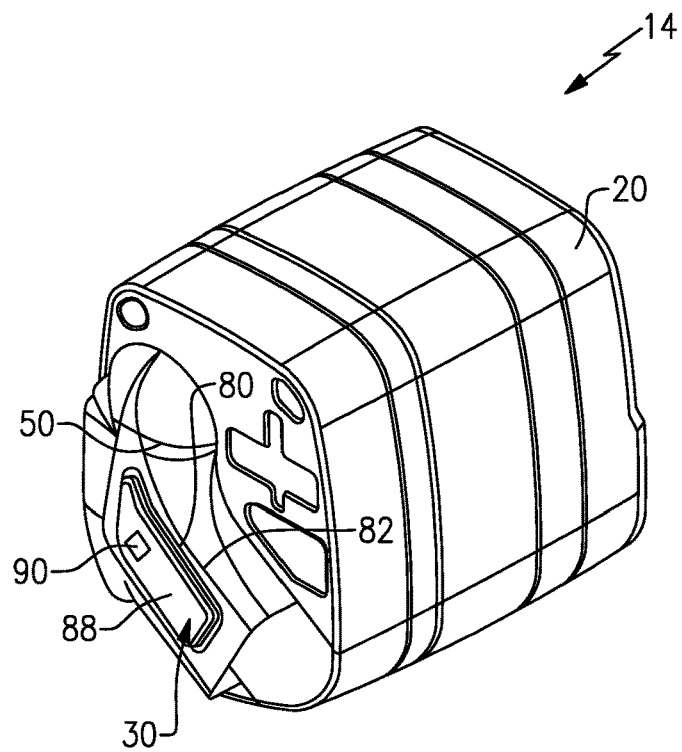
FIG. 4 shows another example of a box-type configuration.

As shown in FIG. 3, the outlet duct 50 is integrated to the end wall 48 of a stamping of the housing 20. The heat exchanger 30 is mounted within the outlet duct 50 (FIG. 2) and can be welded or brazed to the stamping. FIG. 4 shows a configuration where the heat exchanger 30 comprises a housing portion 88 that is integrated into the stamping of the outlet duct 50. The housing 88 includes the inlet 80 and outlet 82 ports.

In one example, an insulating layer 90 is included on a surface of the outlet duct 50 and/or or heat exchanger housing portion 88 that is exposed to atmosphere. This further reduces the exiting temperature. The insulating layer 90 can comprise insulating material, a heat shield, etc.

The control system 36 can be used to achieve a desired tailpipe exhaust temperature. The control system 36 can be a separate control system or can be the same control system used to control the reductant supply. One or more sensors 68, such as temperature or flow rate sensors for example, can monitor temperature and/or flow rate data that is communicated to the control system 36. The control system 36 uses the data to control the exit temperature from the outlet 26 such that the temperature does not exceed a maximum allowable tailpipe exhaust temperature. In one example, the control system 26 controls the reductant supply flow rate to manage heat transfer rates in order to influence tailpipe gas temperature.

In one optional embodiment, one or more additional components 70 can be coupled to the tailpipe 16. These additional components 70 could comprise heat exchangers and/or acoustic elements, for example.

In one optional embodiment, a structure 72 comprising metal foam or wire mesh 72 can be located on an inside surface of the tailpipe 16. The structures 72 could be brazed and/or laser welded.

The subject invention incorporates a heat exchanger 30 into a box design for an exhaust system 10. Box aftertreatment designs have a tailpipe exit temperature limit to avoid overheating of the ground/road. This is challenging to achieve in the small packaging space that is available in box configurations. The incorporation of the heat exchanger 30 into the outlet duct 50 of the box housing 20 reduces exhaust gas exit temperatures to acceptable levels. Further, the use of the heat exchanger 30 allows for the additional use of energy recovery and/or chemical conversion.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An exhaust component comprising:
   a housing defining an internal cavity, the housing having an inlet configured to receive engine exhaust gases and an outlet configured to direct the engine exhaust gasses into a tailpipe;
   at least one exhaust aftertreatment component positioned within the internal cavity;
   a reductant source associated with the housing, the reductant source producing ammonia to mix with engine exhaust gases entering the exhaust aftertreatment component; and
   a heat exchanger positioned within the internal cavity to reduce a temperature of the engine exhaust gases exiting the outlet.

2. The exhaust component according to claim 1, including an outlet duct that is positioned at least partially within the internal cavity, wherein the heat exchanger is positioned within the outlet duct, and wherein the outlet duct has a downstream end that is configured to direct the engine exhaust gases generated by a vehicle engine to the outlet from the housing, and wherein the outlet from housing directs engine exhaust gases into the tailpipe which comprises a vehicle exhaust gas outlet to atmosphere.

3. The exhaust component according to claim 2, including an inlet tube having an upstream end configured to be coupled to the vehicle engine and a downstream end coupled to the inlet to the housing, and wherein the outlet duct defines an engine exhaust gas flowpath having a variable cross-section.

4. The exhaust component according to claim 3, wherein engine exhaust gas flowpath has a first cross-section at an upstream location that receives engine exhaust gases exiting the exhaust aftertreatment component and a second cross-section at a downstream location that is associated with the outlet, and wherein the second cross-section is greater than the first cross-section.

5. The exhaust component according to claim 1, wherein the housing has a box shape with an outlet duct integrated into an end wall of a stamping of the housing, and wherein the heat exchanger is associated with the outlet duct.

6. The exhaust component according to claim 5, wherein a portion of a heat exchanger housing is integrated into the outlet duct.

7. The exhaust component according to claim 1, wherein energy recovered from the heat exchanger is used to heat reductant from the reductant source.

8. The exhaust component according to claim 1, including a control system that controls the heat exchanger to provide a predetermined tailpipe temperature.

9. The exhaust component according to claim 8, including one or more sensors that can monitor temperature and/or flow rate data and communicate the temperature and/or flow rate data to the control system, and wherein the control system is configured to use the temperature and/or flow rate data to control an exit temperature from the outlet of the housing such that the exit temperature does not exceed a maximum allowable tailpipe exhaust temperature for a vehicle tailpipe.

10. The exhaust component according to claim 9, wherein the control system controls reductant supply flow rate to manage heat transfer rates in order to control a vehicle tailpipe gas temperature.

11. The exhaust component according to claim 1, wherein the reductant source comprises a cartridge with a solid reductant, and wherein reductant is directly supplied into an open area within the internal cavity that is upstream from the at least one exhaust aftertreatment component.

12. The exhaust component according to claim 1, wherein the reductant source comprises a fluid supply with a doser, and wherein reductant is injected directly into an open area within the internal cavity that is upstream from the at least one exhaust aftertreatment component.

13. The exhaust component according to claim 1, wherein the tailpipe is coupled to the outlet and including an additional heat exchanger coupled to the tailpipe.

14. The exhaust component according to claim 1, wherein the housing comprises a box-shaped configuration having a plurality of sidewalls and a pair of end walls that are connected to opposing edges of the sidewalls to enclose the internal cavity, and including an outlet duct that is positioned at least partially within the internal cavity of the housing and has an upstream end that receives exhaust gases exiting the at least one exhaust aftertreatment component and a downstream end that directs exhaust gas flow to the outlet from the housing.

15. The exhaust component according to claim 14, wherein the outlet duct is integrally formed with one end wall of the housing, and wherein the heat exchanger comprises a housing portion that is integrally formed with the outlet duct.

16. An exhaust component comprising:
a housing defining an internal cavity, the housing having an inlet configured to receive engine exhaust gases and an outlet;
at least one exhaust aftertreatment component positioned within the internal cavity;
a reductant source associated with the housing, the reductant source producing ammonia to mix with engine exhaust gases entering the exhaust aftertreatment component;
a tailpipe coupled to the outlet; and
a heat exchanger positioned within the internal cavity to reduce a temperature of the engine exhaust gases prior to exiting the outlet and entering the tailpipe.

17. The exhaust component according to claim 16, including an outlet duct that is positioned at least partially within the internal cavity, wherein the heat exchanger is located within the outlet duct, and wherein the outlet duct has a downstream end that directs engine exhaust gases generated by a vehicle engine into the outlet from the housing, and wherein the outlet from housing directs engine exhaust bases into the tailpipe which comprises a vehicle exhaust gas outlet to atmosphere.

18. The exhaust component according to claim 17, including an inlet tube having an upstream end configured to be coupled to the vehicle engine and a downstream end coupled to the inlet to the housing, and wherein the outlet duct defines an engine exhaust gas flowpath having a variable cross-section.

19. The exhaust component according to claim 16, wherein the reductant source comprises a cartridge with a solid reductant and/or a doser, and wherein reductant is supplied directly into an open area within the internal cavity that is upstream from the at least one exhaust aftertreatment component.

20. The exhaust component according to claim 16, including a control system that controls the heat exchanger to provide a predetermined tailpipe temperature.

21. The exhaust component according to claim 20, including one or more sensors that can monitor temperature and/or flow rate data and communicate the temperature and/or flow rate data to the control system, and wherein the control system is configured to use the temperature and/or flow rate data to control an exit temperature from the outlet of the housing such that the exit temperature does not exceed a maximum allowable tailpipe exhaust temperature for a vehicle tailpipe.

22. The exhaust component according to claim 21, wherein the control system controls reductant supply flow rate to manage heat transfer rates in order to control a vehicle tailpipe gas temperature.

23. The exhaust component according to claim 16, wherein the housing comprises a box-shaped configuration having a plurality of sidewalls and a pair of end walls that are connected to opposing edges of the sidewalls to enclose the internal cavity, and including an outlet duct that is positioned at least partially within the internal cavity of the housing and has an upstream end that receives exhaust gases exiting the at least one exhaust aftertreatment component and a downstream end that directs exhaust gas flow to the outlet from the housing.

24. The exhaust component according to claim 23, wherein the outlet duct is integrally formed with one end wall of the housing, and wherein the heat exchanger comprises a housing portion that is integrally formed with the outlet duct.

25. The exhaust component according to claim 16, including an inlet tube having an upstream end configured to be coupled to a vehicle engine and a downstream end coupled to the inlet to the housing, and wherein the exhaust aftertreatment component comprises at least one SCR catalyst, and wherein the reductant source is mounted to the housing to supply reductant to an open area within the internal cavity that is immediately upstream from the at least one SCR catalyst.

* * * * *